July 6, 1965 J. J. GODBEY 3,193,756

VOLTAGE PROTECTOR AND ATTENUATOR FOR RECEIVER INPUT CIRCUITS

Filed Jan. 29, 1962 3 Sheets-Sheet 1

INVENTOR.
JOSIAH J. GODBEY
BY Moody and Antrim
AGENTS

INVENTOR.
JOSIAH J. GODBEY
BY Moody and Antrim
AGENTS

VOLTAGE PROTECTOR AND ATTENUATOR FOR RECEIVER INPUT CIRCUITS

Filed Jan. 29, 1962 3 Sheets-Sheet 3

INVENTOR.
JOSIAH J. GODBEY
BY Moody and Antrim
AGENTS 3,193,756

VOLTAGE PROTECTOR AND ATTENUATOR FOR RECEIVER INPUT CIRCUITS

Josiah J. Godbey, Richardson, Tex., assignor to Collins Radio Company, Cedar Rapids, Iowa, a corporation of Iowa Filed Jan. 29, 1962, Ser. No. 169,533
3 Claims. (Cl. 323—17)

This invention pertains to voltage limiting circuits and particularly to voltage protectors for receiver input circuits.

Radio receiver input circuits with transistors require protection from strong signals to prevent destruction of the transistors. Signals received from transmitters located close to the receiving antenna or received from other electrical sources that cause strong transient currents in the antenna circuit could otherwise destroy quickly the transistor to which the signals are first applied.

A protective network in which diodes are used as shunting elements does not provide adequate protection in antenna circuits tuned to high frequencies. In such a protective circuit that has series ballast elements between an antenna circuit and a receiver input circuit in addition to diodes across the receiver input circuit, the forward resistance of the diodes is too high to provide an adequate short-circuit across the receiver input circuit. As the antenna circuit is tuned to higher frequencies the diodes are still less effective because of the delayed response resulting from the combination of their forward resistance and their inherent shunt capacitance.

In the present invention, ballast components are used as series elements, but transistors are used as shunt short-circuiting devices. In an embodiment of this invention, shunt transistors are combined with an attenuation control circuit so that the conductivity of the transistors is controlled to provide in response to reception of signal at normal levels, desired attenuation and in response to reception of signals at high levels, protective short-circuiting.

An object of this invention is to provide protection for input transistor circuits of receivers that are tuned to high frequencies.

Another object is to combine an input attenuation circuit with the voltage protection circuit.

The following description and the appended claims may be better understood with reference to the accompanying drawings in which:

Figure 1:
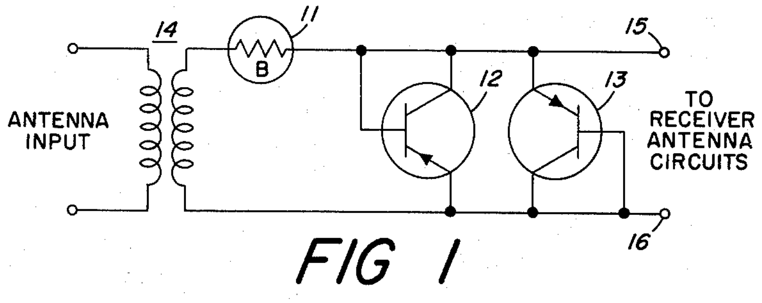
FIG. 1 is a schematic diagram of an antenna protector using shunt transistors.

In FIG. 1 a voltage limiter for protecting receiving circuits comprises a series ballast lamp 11 and shunt transistors 12 and 13. The ballast lamp is connected between antenna coupler 14 and a receiver antenna input terminal 15; the transistors are connected between receiver input terminals 15 and 16. The ballast lamp 11 has increasing resistance for signals above a normal level while the shunting impedance of transistors 12 and 13 decreases. Much of the power of interfering signal that might be damaging to receiver circuits is dissipated by the lamp and the transistors. The transistors 12 and 13 are connected in opposite senses so that they are alternately conductive on different one-half cycles to provide substantial reduction in impedance to the signal during all its phases in which voltage is excessive. In detail, the joined collector and base of the transistor 12 are connected to the antenna terminal 15 of the receiver circuit and the emitter is connected to the ground terminal. The other transistor 13 is connected in the opposite sense to the same receiver terminals.

Figure 2:
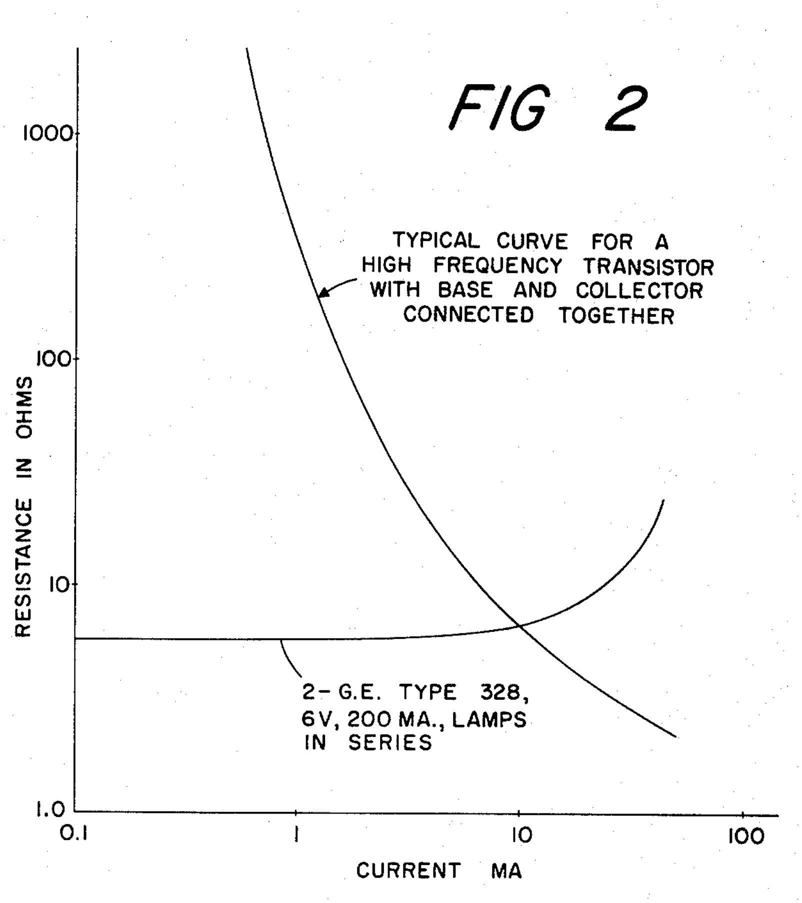
FIG. 2 is a graph showing a characteristic curve of a transistor with base and collector connected together and also a resistance curve for a suitable lamp used as series ballast resistor.
Figure 3:
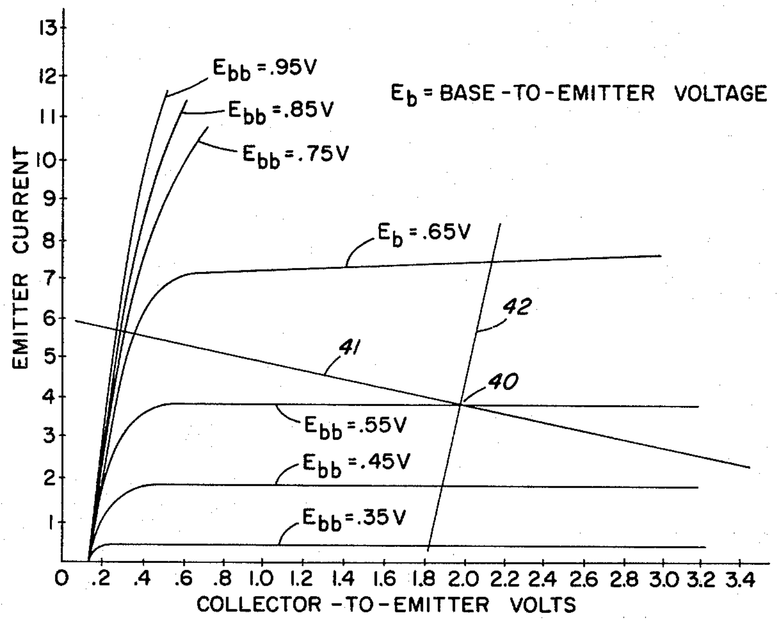
FIG. 3 is a family of curves for a typical type PNP transistor that is used as a shunt circuit.

Variation in resistance of a suitable transistor with change in current flow is illustrated by the descending curve of FIG. 2 while the variation of resistance of two typical lamps in series is illustrated by the ascending curve. Increasing signal current flow in the circuit of FIG. 1 is effective to reduce the shunt resistance of the transistors as shown in FIG. 2 as soon as the voltage across the transistors is high enough to start substantial current flow through them. With reference to FIG. 3, the current becomes substantial when the voltage across the transistors reaches approximately 0.1 volt. After the current becomes much in excess of 10 milliamperes, the resistance of the lamps rises rapidly. The rapid change from little attenuation for signals up to 100 millivolt input before current starts to flow in the transistors, to greater attenuation required for protecting receiver circuits is shown by the top curve of FIG. 4. In a system in which the maximum allowable input voltage is less than 1 volt, the protective circuit of either FIG. 1 or FIG. 5 provides sufficient attenuation at any signal level that is expected to be received to limit the signal to that level.

Figure 5:
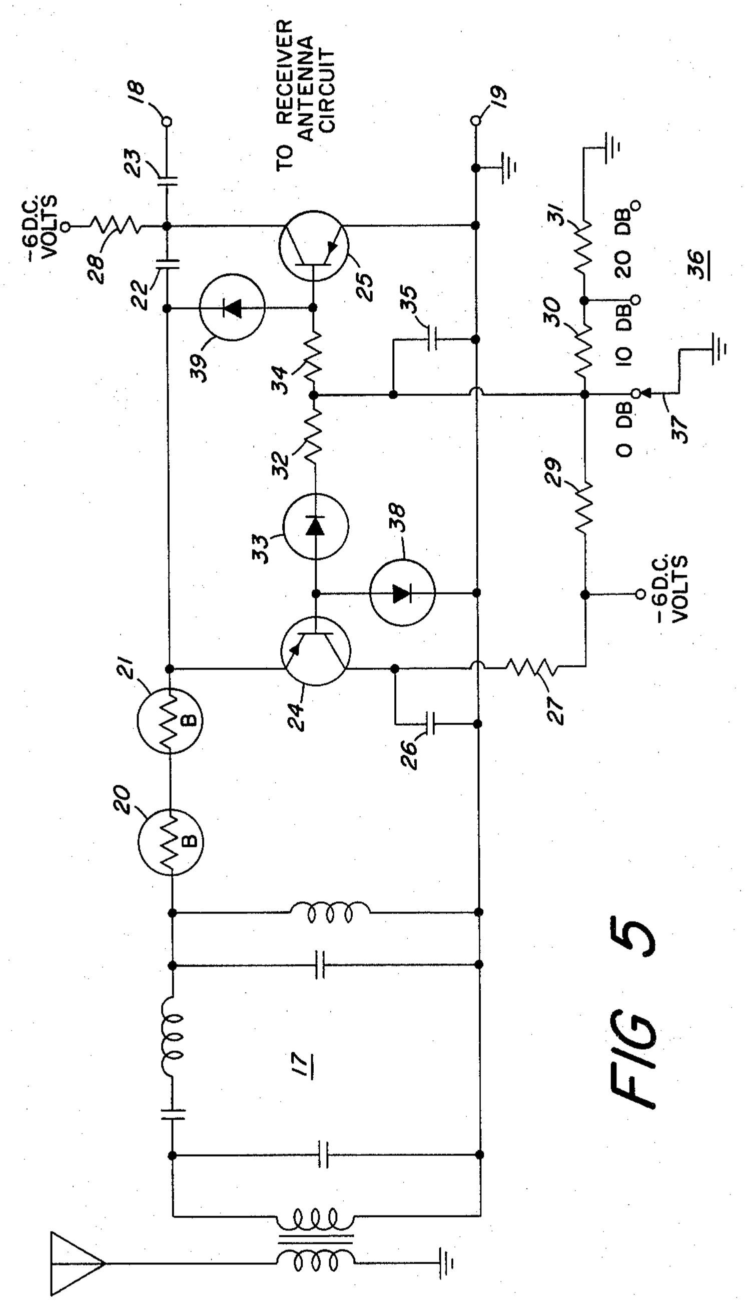
FIG. 5 is a schematic diagram of a combination antenna protector and signal attenuator.

A combination of a voltage protector and an attenuator is shown in FIG. 5. The attenuator switch controls the biasing of the shunt transistors. When the attenuator control is adjusted for minimum attenuation, the circuit operates as that of FIG. 1 to provide minimum attenuation for signals of low level but high attenuation for protection of receiver circuits at high levels. At other positions of the attenuator switch, the transistors are biased so that they conduct sufficient current even during reception of signals within the normal range of signal voltages to provide desired constant attenuation at the low levels of signals. At these positions of the attenuator switch for attenuating signals of all levels, the diodes shown in conjunction with the transistors become conductive in response to application of abnormally strong signals. The conductive diodes short-circuit the biasing circuit so that the transistors are then effectively connected directly across the antenna circuits as shown in FIG. 1 to provide high attenuation for strong signals.

In more detail, the biasing lamps 20 and 21 are connected in series between the antenna coupler 17 and the antenna receiver terminal 18. The capacitors 22 and 23 are also connected in the series circuit between the antenna coupler and the antenna receiver terminals to isolate direct-current circuits that bias transistors 24 and 25. The capacitors 22 and 23 have low impedance for signal so that the series lamps 20 and 21 are effectively connected directly to terminal 18. The emitter-collector circuits of transistors 24 and 25 are connected in opposite senses, through these capacitors, across the receiver input circuits that are connected to terminals 18 and 19. The bases of the transistors are connected to adjustable biasing circuits for low-level signals and are connected through diodes to their respective collector circuits for abnormally high signals.

Specifically, the emitter of transistor 24 is connected through capacitors 22 and 23 to the antenna terminal, and the emitter of transistor 25 is connected directly to the ground terminal 19. The collector of transistor 24 is connected through bypass capacitor 26 to the ground terminal for signal circuits, and the collector of transistor 25 is connected through coupling capacitor 23 to the antenna terminal of the receiver circuit. The negative voltage with reference to ground for operating a type PNP transistor 24 is connected through resistor 27 to the collector of transistor 24, and likewise the voltage for operating transistor 25 is connected through resistor 28 to the collector of transistor 25.

Adjustable biasing voltage for the base circuits of the transistors is supplied from the voltage divider that comprises resistors 29, 30 and 31 connected in series between the source of negative voltage and ground. The junction of resistors 29 and 30 is connected through resistor 32 and diode 33 to the base of transistor 24 and the junction is also connected through resistor 34 to the base of transistor 25. Signal is bypassed by capacitor 35 that is connected between ground and the junction.

The switch 36 for setting the base bias voltage may have settings for desired degrees of attenuation. In this example, the switch has operating positions for 0, 10, and 20 decibels of attenuation. When the switch wiper 37 that is connected to ground is positioned on the switch contact for 0 decibels, the base of each of the transistors 24 and 25 is connected to ground potential and therefore is at the same potential as its respective emitter. The circuit then operates to provide minimum attenuation as the circuit shown in FIG. 1 until the signal substantially exceeds a normal value. When the wiper 37 is positioned in the 10-decibel position, a small negative voltage is applied to each of the bases so that the transistors are conductive so that they provide a shunt circuit of fairly low impedance at normal signal levels to provide 10 decibels of attenuation as shown in the left part of the middle curve of FIG. 4. Likewise, a greater negative voltage is applied to the bases for the 20-decibel position to provide attenuation according to the bottom curve of FIG. 4.

Figure 4:
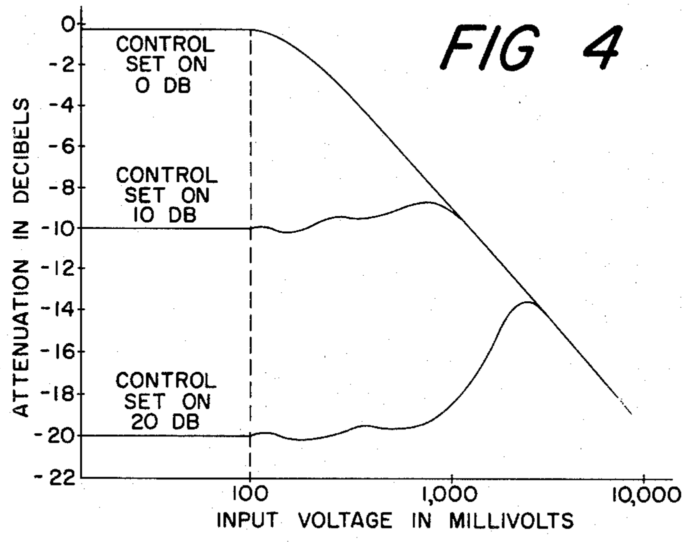
FIG. 4 is a family of typical attenuation curves for a circuit in which the base voltage of the shunt transistors is changed.

In order to provide maximum attenuation for high signal levels, diode 38 is connected between the base of transistor 24 and its collector through capacitor 26, and diode 39 is connected between the base and the collector of transistor 25 through coupling capacitor 22. Normally when the switch 36 is set for 10 or 20 decibels of attenuation, the diodes are reversed biased. When the signal applied from the antenna coupler 17 becomes somewhat greater than the reversed bias applied to the diodes, the diodes become conductive so that the respective base and collector of the transistors are connected together at high signal levels to provide maximum conductivity of the transistors thereby to provide maximum attenuation at high signal levels as shown in the curves of FIG. 4.

Different degrees of attenuation corresponding to different settings of the attenuator are obtained for low-level signals by operating the transistors at different points on their characteristic curves shown in FIG. 3. For example, assume that the collector of transistor 25 of FIG. 5 is biased so that the transistor is operated at point 40 on that emitter-collector curve shown for Ebb equals 0.55 volts. When resistor 28 in the collector circuit is 1,000 ohms, the load line through point 40 is line 41. However, since resistor 28 is bypassed for signal frequencies and the load line represents only a static condition, the load line is useful only to show how the operating point of the transistor shifts with changing direct-current bias. If diode 39 were disconnected, the signal voltage would be applied only to the collector of the transistor, and the alternating-current impedance between the collector and the emitter would be very high. This is obvious because, as the curve shows, the collector current changes very little with moderate changes in collector voltage.

For low-level signals the diode 39 which is connected between the signal circuit and the base of transistor 25 is reversed biased. However it has sufficient capacitance so that impedance to high-frequency signal is relatively low and it effectively connects the base to the signal circuit. The change in base voltage is then effective to operate the transistor at an impedance represented by the slope of the line 42 which is drawn through point 40. When the amplitude of the signal becomes so great that additional attenuation is required for limiting, diode 39 becomes conductive so that the base voltage increases. For high amplitudes, the transistor operates in a saturated or nearly saturated condition and its impedance would nearly correspond to that represented by the slope shown for one of the characteristic curves when Ebb is greater than 0.75 volt. Therefore, when the incoming signal is strong, the transistor works on a curve that has a slope which varies directly with the amplitude of the signal.

The transistors in the voltage limiters are able to control high-level signals without damage to them or to transistors in succeeding receiving circuits. The voltage control transistors are the type that can inherently dissipate greater power than the transistors used in the first stages of receiving circuits, and unlike the transistors in the receiving circuits, the control transistors are operated in a saturated condition during reception of high-level signals so that the voltage drop across the control transistors is low even though current through them is high. During periods of sustained high-level signal, the power of the signal is mostly dissipated in the series ballast lamps which then have high resistance because of heat caused by current flow through the transistors. Even though the filament temperatures of the lamps do not follow instantaneous surges of current and are therefore ineffective in dissipating short bursts of power, much of the power is lost in the input coupler which has an impedance of about 150 ohms rather than in the transistors. The transistors safely dissipate surges of power that are much in excess of their average power capabilities.

An attenuator with a circuit of FIG. 5 operates to provide attenuation curves of FIG. 4 when the series lamps 20 and 21 are General Electric type 328 lamps rated at 6 volts, 200 milliamperes; the shunt transistors 24 and 25 are germanium PNP transistors, type 2N1143; and the diodes 33, 38, and 39 are Transitron type T12G. The values of other component parts are typically:

| | | |
|---|---|---|
| Capacitors 22, 23, 26, and 35 | micromicrofarads | 4,700 |
| Resistors 27, 28, 29, 32 and 34 | ohms | 1,000 |
| Resistor 30 | do | 100 |

Diode 33 in the base biasing circuit of transistor 24 modifies the attenuation curve for the zero setting of the attenuator. Without the diode, change in attenuation starts at such a low level that minimum attenuation cannot be maintained to the 100 millivolt level as shown in FIG. 4. The attenuation change starts too soon because the transistor starts to be biased by emitter-base current at a low level and attenuates the signal. The conductivity of the base-emitter circuit is delayed by the initial high impedance of diode 33 so that the transistor 24 is substantially nonconductive until the signal increases to 100 millivolts.

The voltage protector of this invention can be used to couple signal to the input of any signal circuit that requires low-voltage protection. For low-frequency circuits, the capacitors shown in FIG. 5 must be changed to those having greater values to provide low impedance, and suitable capacitors must be connected in parallel with diodes 38 and 39. Although this invention has been described with respect to particular embodiments thereof, it is not to be so limited, as changes and modifications may be made therein which are within the spirit and scope of the invention as defined by the appended claims.

I claim:

1. In an antenna circuit having antenna input coupling means and receiver input circuits with an antenna terminal and a ground terminal, a combined voltage protector and an adjustable attenuator comprising, current ballast means connected between said coupling means and said antenna terminal, first and second transistors, each having at least a base, an emitter, and a collector, capacity coupling means for each of said transistors for isolating direct-current circuits from signal circuits, said emitter-collector circuit of each of said transistors being connected through said respective coupling means between said antenna terminal and said ground terminal, said emitter-collector circuits being connected in opposite senses across said receiver input circuits to provide full-wave conduction, direct-current voltage means including individual circuit-isolating means for each of said transistors for biasing said collectors relative to said respective emitters in the required sense to prepare said transistors for forward conduction, adjustable voltage divider means including individual circuit-isolating means connected to the base of each of said transistors, said voltage divider being adjustable to change the bias on both of said bases simultaneously for changing the degree of conductivity of both of said transistors, a diode for each of said transistors coupled between said base and said collector of the respective one of said transistors, said diodes becoming conductive in response to application of strong signals from said antenna coupling circuit to said emitter-collector circuits to increase the bias on said respective bases in the direction required for increasing the conductivity of said transistors, said voltage divider being adjusted to provide predetermined attenuation for signal strength substantially below predetermined destructive values, and said diodes becoming conductive regardless of the setting of said voltage divider in response to application of strong input signal to said coupling means to maintain the signal across said antenna receiver circuits below said destructive values.

2. In an antenna circuit including an input coupling circuit and first and second terminals for a receiver input circuit, a voltage protector and attenuator comprising, current ballast means connected in series with said input coupling circuit and said terminals, a shunt circuit connected between said terminals, said shunt circuit including a transistor having at least an emitter, a base, and a collector, said emitter being coupled to one of said terminals, the coupling between said emitter and said one terminal providing low impedance for high-frequency signal, said collector being coupled to the other of said terminals, said base also being capacitively coupled to said collector and said other terminal, direct-current means that has relatively high impedance for signal frequencies, said direct-current means biasing said collector with respect to said emitter in the sense required to prepare for control of the emitter-collector current by varying the voltage applied to said base, a diode, adjustable direct-current means having relatively high impedance and said diode connected in series to said base for selectively biasing said transistor for either nonconduction or for different degrees of conduction between said emitter and said collector, said attenuator functioning in response to application of signal of normal low levels to said input coupling circuit to attenuate the applied signal by substantially a fixed amount for each selected degree of conduction, the resistance of said ballast means in response to application of abnormally large input signals increasing rapidly to limit the voltage between said first and second terminals, said diode being connected in the required sense for conduction in response to application of high input signal while said adjustable direct-current means is set for biasing said transistor slightly below that required for conduction when no signal is applied to said input circuit but being substantially nonconductive in response to application of low input signal so that substantially constant attenuation level is extended to the intermediate range of signal levels.

3. In an antenna circuit including an input coupling circuit and first and second terminals for a receiver input circuit, a voltage protector and attenuator comprising current ballast means connected in series with said input coupling circuit and said terminals, a shunt circuit connected between said terminals, said shunt circuit including a transistor having at least an emitter, a base, and a collector, said emitter being coupled to one of said terminals, the coupling between said emitter and said one terminal providing low impedance for high-frequency signal, said collector being coupled to the other of said terminals, direct-current means that has relatively high impedance for signal frequencies, said direct-current means biasing said collector with respect to said emitter in the sense required to prepare for control of the emitter-collector circuit by varying the voltage applied to said base, adjustable direct-current means having relatively high impedance connected to said base for selectively biasing said transistor for either nonconduction or for different degrees of conduction between said emitter and said collector, said attenuator functioning in response to application of signal of normal low levels to said input coupling circuit to attenuate the applied signal by a substantially fixed amount for each selected degree of conduction, the resistance of said ballast means in response to application of abnormally large input signals increasingly rapidly to limit the voltage between said first and second terminals, a diode, means for coupling said diode for said high-frequency signal between said base and said collector, and means for connecting said diode in a direct-current circuit between said base and said emitter, said diode being connected in the required sense to become conductive only for said high levels of said high-frequency signal, thereby, to effectively connect said base to said collector and to maintain signal voltage between said first and second terminals below a specified safe value during application of high signal voltages to said input coupling circuit.

References Cited by the Examiner

UNITED STATES PATENTS

| | | | |
|---|---|---|---|
| 2,557,888 | 6/51 | Olson | 333—81 X |
| 2,607,888 | 8/52 | Bell | 323—24 X |
| 2,695,956 | 11/54 | Mallinchrodt | 323—24 X |
| 2,703,382 | 3/55 | Cleary | 323—24 X |
| 2,835,867 | 5/58 | Golden | 323—81 X |
| 3,023,326 | 2/62 | Cone | 307—88.5 |
| 3,070,712 | 12/62 | Evans | 307—88.5 |

LLOYD McCOLLUM, *Primary Examiner.*